US008749518B2

(12) United States Patent
Kuo

(10) Patent No.: US 8,749,518 B2
(45) Date of Patent: Jun. 10, 2014

(54) CAPACITIVE TOUCH SENSOR AND CAPACITIVE TOUCH APPARATUS

(75) Inventor: Chun-Ku Kuo, Hsin-Chu (TW)

(73) Assignee: AU Optronics Corp., Hsinchu (TW)

( * ) Notice: Subject to any disclaimer, the term of this patent is extended or adjusted under 35 U.S.C. 154(b) by 579 days.

(21) Appl. No.: 13/166,196

(22) Filed: Jun. 22, 2011

(65) Prior Publication Data

US 2012/0062250 A1    Mar. 15, 2012

(30) Foreign Application Priority Data

Sep. 15, 2010  (TW) ............................. 99131270 A

(51) Int. Cl.
*G06F 3/041*    (2006.01)
*G06F 3/045*    (2006.01)
*G06F 3/044*    (2006.01)
*G06F 3/0488*   (2013.01)

(52) U.S. Cl.
CPC ............... *G06F 3/044* (2013.01); *G06F 3/041* (2013.01); *G06F 3/0488* (2013.01)
USPC ......................................... 345/174; 345/173

(58) Field of Classification Search
CPC ........... G06F 3/01; G06F 3/041; G06F 3/044; G06F 3/0488; G06F 3/04883; G01N 27/22; G01N 27/227; G01N 27/228; G01N 27/60; G01N 2015/0853; G01N 2027/22; G01D 5/24; G01D 5/241; G01D 5/2412; G01D 5/2417; G06K 9/0002; G06K 9/00013; G06K 9/00006; G01L 1/14; G01L 1/142; G01L 9/0072; G01R 27/2605; G01B 7/22; G08B 13/26
USPC ................. 324/686, 661, 658, 649, 600, 519; 345/174, 173; 73/304 C, 718, 724, 780, 73/335.04, 514.32, 862.337, 862.626; 340/562, 545.4; 702/52, 47
See application file for complete search history.

(56) References Cited

U.S. PATENT DOCUMENTS

| 6,297,811 | B1 | 10/2001 | Kent et al. | |
|---|---|---|---|---|
| 7,009,876 | B2 * | 3/2006 | Okazawa | 365/171 |
| 7,288,726 | B2 * | 10/2007 | Chang | 174/261 |
| 2009/0194344 | A1 | 8/2009 | Harley et al. | |
| 2009/0219257 | A1 | 9/2009 | Frey et al. | |
| 2010/0123670 | A1 | 5/2010 | Philipp | |
| 2010/0214262 | A1 * | 8/2010 | Ishizaki et al. | 345/174 |
| 2010/0309167 | A1 * | 12/2010 | Nam | 345/174 |
| 2010/0328255 | A1 * | 12/2010 | Ishizaki et al. | 345/174 |
| 2011/0134073 | A1 * | 6/2011 | Ahn | 345/174 |

* cited by examiner

FOREIGN PATENT DOCUMENTS

TW    201023014    6/2010

OTHER PUBLICATIONS

Taiwan Patent Office, "Office Action", Sep. 26, 2013.

*Primary Examiner* — Hoai-An D Nguyen
(74) *Attorney, Agent, or Firm* — WPAT, PC; Justin King

(57) ABSTRACT

An exemplary capacitive touch sensor includes a first wire-like electrode and a second wire-like electrode. The first wire-like electrode includes at least a first main wire and multiple first sub-wires, the first main wire continuously extends along a first direction, and the first sub-wires are electrically connected with the first main wire. The second wire-like electrode includes at least a second main wire, and the second main wire continuously extends along a second direction different from the first direction. Moreover, the first wire-like electrode and the second wire-like electrode are electrically insulated from each other and each is made of an opaque conductive material. The second main line is arranged crossing over the first main wire. Furthermore, a capacitive touch apparatus using the above-mentioned capacitive touch sensor is provided.

20 Claims, 11 Drawing Sheets

CAPACITIVE TOUCH SENSOR AND CAPACITIVE TOUCH APPARATUS

TECHNICAL FIELD

The disclosure generally relates to touch-control technologies and particularly, to a capacitive touch sensor and a capacitive touch apparatus.

BACKGROUND

A current mutual-capacitance type projective capacitive touch sensor generally uses a transparent conductive material such as indium tin oxide (ITO) to manufacture a driving electrode and a sensing electrode thereof. However, in one aspect, since the transparent conductive material generally has an excessive large resistance, which would cause sensed signal of large-sized projective capacitive touch panel to be attenuated. In another aspect, the capacitive touch sensor manufactured by the transparent conductive material would have unwanted increase of parasitic capacitance resulting from large area of sensing electrode and thus is vulnerable to ambient noise interference so that the sensed signal is attenuated. In still another aspect, the capacitive touch sensor manufactured by the transparent conductive material is difficult to achieve highly symmetrical inter-electrode patterns and therefore the linearity of interpolation signal between sensors is hard to achieve a good status during the rear-end signal processing. In addition, the cost of the transparent conductive material is relatively high.

SUMMARY

Accordingly, the present invention is directed to a capacitive touch sensor, expected to achieve the purpose of decreasing the sensor resistance and the parasitic capacitance between the sensor and external structure, improving the touch detection linearity and reducing the cost.

The present invention is further directed to a capacitive touch apparatus.

More specifically, a capacitive touch sensor in accordance with an embodiment of the present invention includes a first wire-like electrode and a second wire-like electrode. The first wire-like electrode includes at least a first main wire and a plurality of first sub-wires. Each of the at least a first main wire continuously extends along a first direction. The first sub-wires are electrically connected with the at least a first main wire. The second wire-like electrode includes at least a second main wire. Each of the at least a second main wire each continuously extends along a second direction different from the first direction. Moreover, the first wire-like electrode and the second wire-like electrode are electrically insulated from each other, and each of the first wire-like electrode and the second wire-like electrode is made of an opaque conductive material. The at least a second main wire is/are arranged crossing with the at least a first main wire.

In one embodiment, the opaque conductive material includes metal.

In one embodiment, the at least a second main wire is/are non-intersected with the first sub-wires.

In one embodiment, the second wire-like electrode further a plurality of second sub-wires, the second sub-wires are electrically connected with the at least a second main wire and non-intersected with the at least a first main wire and the first sub-wires.

In one embodiment, the capacitive touch sensor further includes a plurality of wire-like dummy electrodes arranged in a region of the capacitive touch sensor unoccupied by the first wire-like electrode and the second wire-like electrode. The wire-like dummy electrodes are electrically insulated from both the first wire-like electrode and the second wire-like electrode.

In one embodiment, the wire-like dummy electrodes cooperative with the first wire-like electrode and the second wire-like electrode constitute a plurality of square meshes, a plurality of diamond meshes, a plurality of rectangle meshes or a plurality of other arbitrary polygon meshes.

In one embodiment, each of the at least a first main wire is a linear structure, each of some of the first sub-wires extending along the first direction is discontinuous and correspondingly can be a linear structure. In another embodiment, each of the at least a first main wire is a comb-like structure, each of some of the first sub-wires extending along the first direction is discontinuous and correspondingly can be a comb-like structure. In still another embodiment, each of the at least a first main wire is a twisting structure, each of some of the first sub-wires extending along the first direction is discontinuous and correspondingly can be a twisting structure. Moreover, the twisting structure can include successively-connected a plurality of polygons such as diamonds, rectangles or other arbitrary polygons.

In one embodiment, the first direction and the second direction are substantially perpendicular with each other.

A capacitive touch apparatus in accordance with an embodiment of the present invention includes a plurality of first metallic electrodes and a plurality of second metallic electrodes. The first metallic electrodes are electrically insulated from each other. The second metallic electrodes are electrically insulated from each other. Each of the first metallic electrodes serves as a plurality of metallic driving electrodes, each of the second metallic electrodes serves as a plurality of metallic sensing electrodes, and thereby the first metallic electrode are arranged crossing/intersecting with the second metallic electrodes to form a plurality of capacitive touch sensors each configured with one of the metallic driving electrodes and one of the metallic sensing electrodes. Moreover, one of each of the first metallic electrodes and each of the second metallic electrodes includes at least a first main wire and a plurality of first sub-wires connected with the at least a first main wire, and the at least a first main wire each continuously extends along a first direction. The other one of each of the first metallic electrodes and each of the second metallic electrodes includes at least a second main wire, the at least a second main wire is/are continuously extend(s) along a second direction different from the first direction and arranged crossing with the at least a first main wire.

A capacitive touch sensor in accordance with another embodiment of the present invention includes a driving electrode and a sensing electrode. The sensing electrode and the driving electrode are electrically insulated from each other and both are made of an opaque conductive material. One of the driving electrode and the sensing electrode includes a plurality of first wires, some of the first wires extend(s) along a first direction, and the other of the first wires extend(s) along a second direction intersecting with the first direction. The other one of the driving electrode and the sensing electrode includes at least a second wire. The at least a second wire and the first wires cooperatively form at least a spatial intersecting point.

In summary, the various embodiments of the present invention use the opaque conductive material to manufacture the wire-like electrodes in the capacitive touch sensor, which is different from the prior art that uses the transparent conductive material to manufacture the sheet-like electrodes. The wire-like opaque conductive electrodes such as wire-like metallic electrodes have the advantages of low resistance and low cost, and the use of wire-like structure would relieve the increase of parasitic capacitance resulting from external noise interference. Furthermore, the transparency of the capacitive touch sensor manufactured by the opaque conductive material is substantially not seriously worse than that of the capacitive touch sensor manufactured by the transparent conductive material. In addition, the capacitive touch sensor in accordance with the present invention can easily achieve highly symmetrical interelectrode patterns. Accordingly, the primary purposes of the present invention about decreasing sensor resistance, parasitic capacitance between the sensor and external structure, improving touch detection linearity and reducing cost can be achieved.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

Features and advantages of various embodiments of the disclosure will be better understood with respect to the following description and drawings, in which like numbers refer to like parts throughout.

DETAILED DESCRIPTION OF PREFERRED EMBODIMENTS

It is to be understood that other embodiment may be utilized and structural changes may be made without departing from the scope of the disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. Accordingly, the descriptions will be regarded as illustrative in nature and not as restrictive.

First Embodiment

Figure 1:
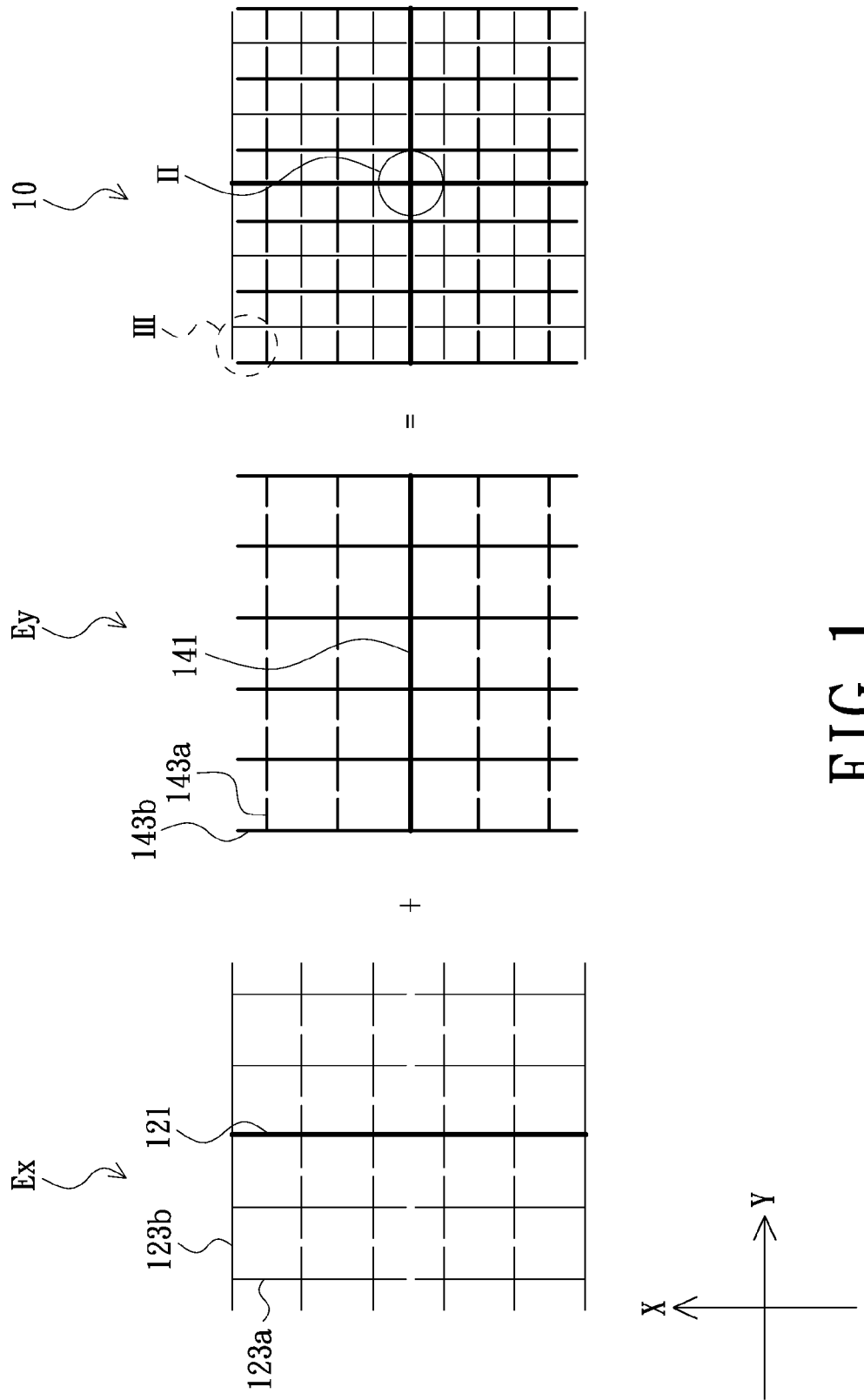
FIG. 1 is a schematic structural view of an X-electrode, a Y-electrode and a single capacitive touch sensor formed by the X-electrode and the Y-electrode in accordance with a first embodiment of the disclosure.

Referring to FIG. 1, a schematic structural view of an X-electrode, a Y-electrode and a single capacitive touch sensor formed by the X-electrode and the Y-electrode in accordance with a first embodiment of the disclosure is shown. As illustrated in FIG. 1, the capacitive touch sensor 10 includes the X-electrode Ex and the Y-electrode Ey, the X-electrode Ex and the Y-electrode Ey cooperatively form a spatial intersecting point (see the portion II circled by a solid circle in FIG. 1). One of the X-electrode Ex and the Y-electrode Ey can serve as a single driving electrode and the other one can serve as a single sensing electrode. In FIG. 1, the X direction and the Y direction are substantially perpendicular to each other, but not to limit the disclosure, and the designer can determine the X direction and the Y direction to be any two directions intersecting with each other according to actual application requirement. In addition, it is noted that, the structure of the single capacitive touch sensor in FIG. 1 only is for the purpose of convenient description and illustration, and in actual applications a plurality of capacitive touch sensors usually are arranged in an array such as in a matrix for use.

In the illustrative embodiment, the X-electrode Ex and the Y-electrode Ey of the capacitive touch sensor 10 are electrically insulated from each other, and each is made of an opaque conductive material such as metal. The X-electrode Ex and the Y-electrode Ey both are wire-like electrodes.

More specifically, X-electrode Ex includes a main wire 121 and a plurality of sub-wires 123*a*, 123*b* electrically connected with the main wire 121. The main wire 121 continuously extends along the X direction and is a linear structure. The sub-wires 123*a* extend along the X direction and each is a discontinuous linear structure. The sub-wires 123*b* extend along the Y direction, some of the sub-wires 123*b* are continuous linear structures, and the other sub-wires 123*b* are discontinuous linear structures. The Y-electrode Ey includes a main wire 141 and a plurality of sub-wires 143*a*, 143*b* electrically connected with the main wire 141. The main wire 141 continuously extends along the Y direction and is a linear structure. The sub-wires 143*a* extend along the Y direction and are discontinuous linear structures. The sub-wires 143*b* extend along the X direction and are continuous linear structures. Moreover, the main wire 141 of the Y-electrode Ey and the main wire 121 of the X-electrode Ex are arranged crossing/intersecting with each other and thereby forming the spatial intersecting point of the capacitive touch sensor 10. The main wire 141 of the Y-electrode Ey is non-intersected with sub-wires 123a, 123b of the X-electrode Ex to form such spatial intersecting point. Likewise, the main wire 121 of the X-electrode Ex is non-intersected with the sub-wires 143a, 143b of the Y-electrode Ey to form such spatial intersecting point.

Figure 2A:
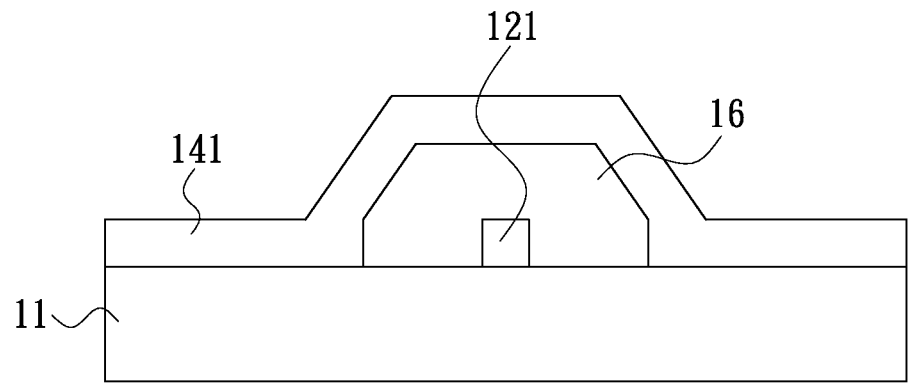
FIGS. 2A and 2B are cross-sectional views of the portion II in FIG. 1 in accordance with two different embodiments.
Figure 2B:
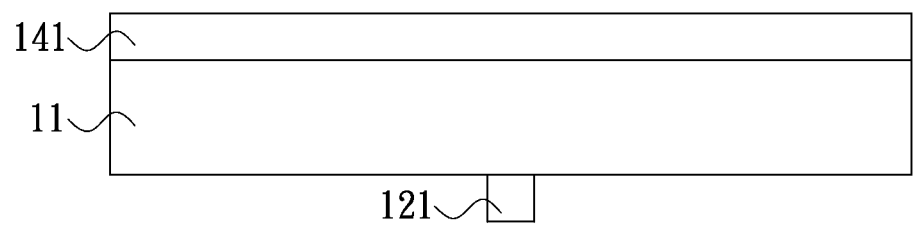

Referring to FIG. 1 and FIGS. 2A, 2B together, FIGS. 2A and 2B showing cross-sectional views of the portion II in FIG. 1 in accordance with two different implementations. In FIG. 2A, the main wire 141 of the Y-electrode Ey and the main wire 121 of the X-electrode Ex are formed on a same side of an insulating substrate 11 such as glass substrate and whereby forming the spatial intersecting point, and further electrically insulated from each other by a dielectric layer 16. In FIG. 2B, the main wire 141 of the Y-electrode Ey and the main wire 121 of the X-electrode Ex are respectively formed on different sides of the insulating substrate 11 and whereby forming the spatial intersecting point, and further electrically insulated from each other by the insulating substrate 11.

Figure 3:
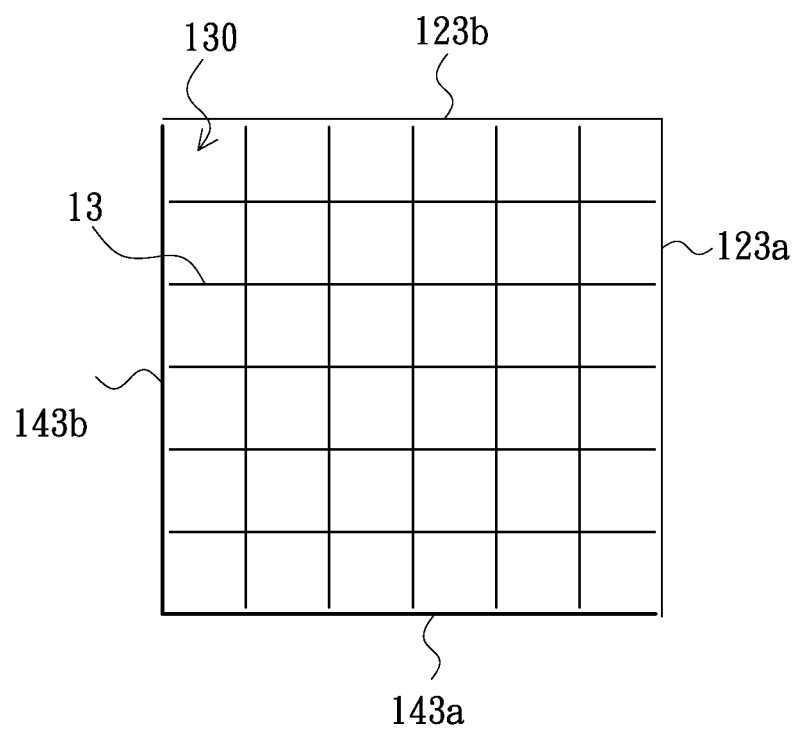
FIG. 3 is an enlarged view of the portion III in FIG. 1 after being added with a wire-like dummy electrode.

Referring to FIGS. 1 and 3 together, FIG. 3 showing an enlarged view of the portion III in FIG. 1 after being added with a wire-like dummy electrode. As illustrated in FIG. 3, the wire-like dummy electrode 13 is arranged in a region of a capacitive touch sensor 10 unoccupied by the X-electrode Ex and the Y-electrode Ey. The wire-like dummy electrode 13 is electrically insulated from both the X-electrode Ex and the Y-electrode Ey, so that electrical signals on the X-electrode Ex and the Y-electrode Ey would not be delivered to the wire-like dummy electrode 13 by wired manner. In addition, the wire-like dummy electrode 13 in the present embodiment can be made of an opaque material such as metal. The wire-like dummy electrode 13 cooperative with the X-electrode Ex and the Y-electrode Ey constitute a plurality of square meshes 130.

Second Embodiment

Figure 4:
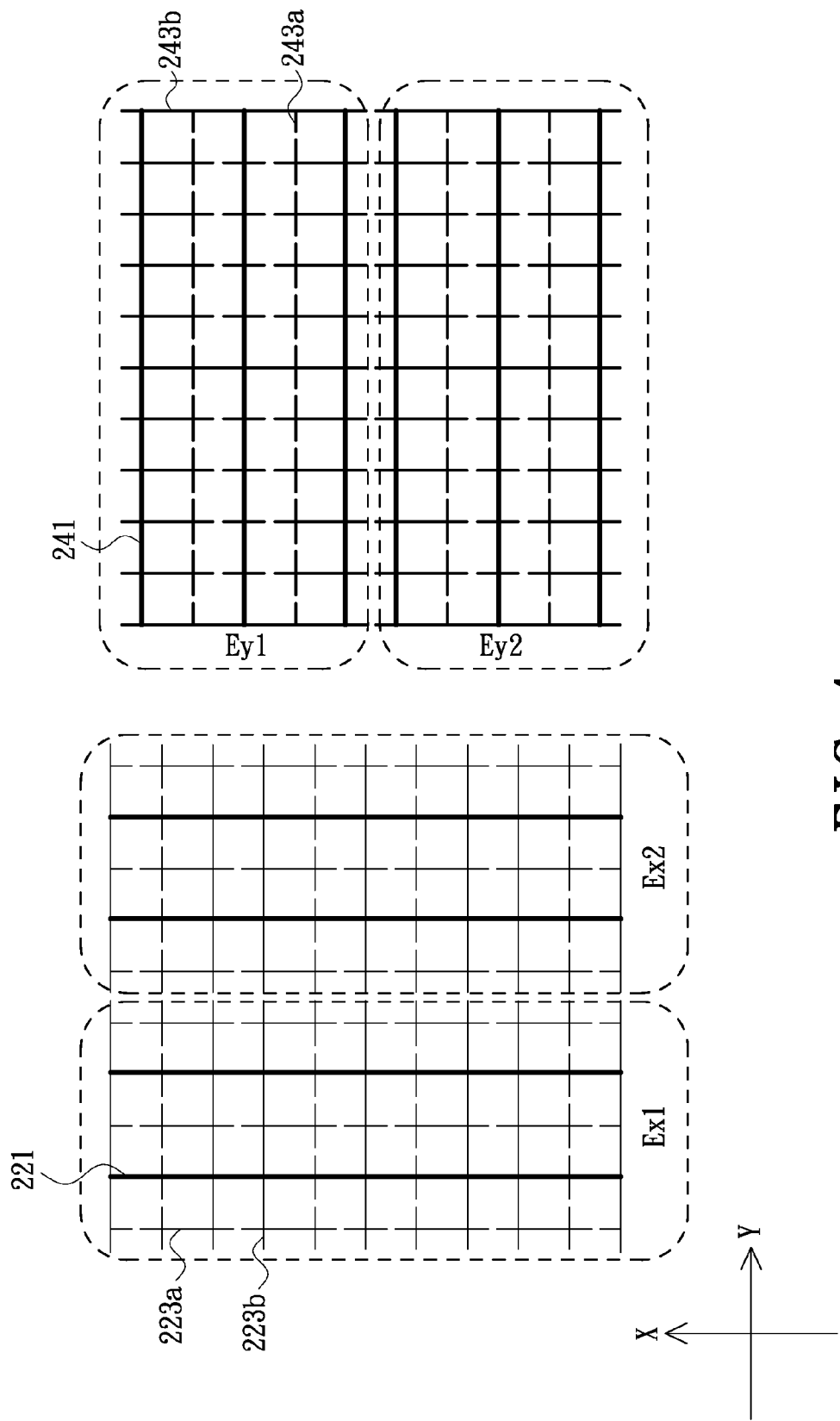
FIG. 4 is a schematic structural view of X-electrodes and Y-electrodes in accordance with a second embodiment of the disclosure.

FIG. 4 shows a schematic structural view of X-electrodes and Y-electrodes in accordance with a second embodiment of the disclosure. In FIG. 4, the X-electrodes Ex1, Ex2 and the Y-electrodes Ey1, Ey2 each is made of an opaque conductive material such as metal. Herein, the X-electrodes Ex1, Ex2 can respectively serve as driving electrodes of two capacitive touch sensors, while the Y-electrodes Ey1, Ey2 can respectively serve as sensing electrodes of two capacitive touch sensors, vice versa. In the present embodiment, the X-electrodes Ex1 and Ex2 can have a same structural configuration and electrically insulated from each other. Each of the X-electrodes Ex1 and Ex2 is a wire-like electrode and includes a plurality of main wires 221 and sub-wires 223a, 223b electrically connected with the main wires 221. The main wires 221 continuously extend along the X direction and are linear structures. The sub-wires 223a extend along the X direction and are discontinuous linear structures. The sub-wires 223b extend along the Y direction, some of the sub-wires 223b are continuous linear structures, and the other sub-wires 223b are discontinuous linear structures. The Y-electrodes Ey1 and Ey2 would have a same structural configuration and are electrically insulated from each other. The Y-electrodes Ey1 and Ey2 both are wire-like electrodes and each includes a plurality of main wires 241 and a plurality of sub-wires 243a, 243b electrically connected with the main wires 241. The main wires 241 continuously extend along the Y direction and are linear structures. The sub-wires 243a extend along the Y direction and are discontinuous linear structures. The sub-wires 243b extend along the X direction, some of the sub-wires 243b are continuous linear structures, and the other sub-wires 243b are discontinuous linear structures.

Figure 5:
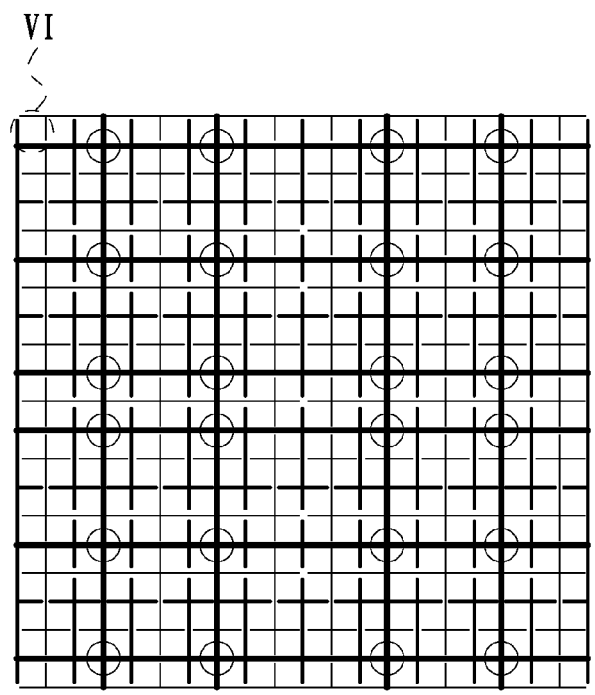
FIG. 5 is a schematic structural view of a plurality of capacitive touch sensors formed by the X-electrodes and Y-electrodes in FIG. 4.

Referring to FIGS. 4 and 5, FIG. 5 showing a schematic structural view of a plurality of capacitive touch sensors formed by the X-electrodes and Y-electrodes in FIG. 4. As illustrated in FIG. 5, the X-electrodes Ex1, Ex2 (as labeled in FIG. 4) are electrically insulated from the Y-electrodes Ey1, Ey2 (as labeled in FIG. 4), and further the X-electrodes Ex1, Ex2 and the Y-electrodes Ey1, Ey2 cooperatively constitute a 2×2 capacitive touch sensor pattern. FIG. 5 shows twenty-four spatial intersecting points (as denoted by the solid circles in FIG. 5), and each of capacitive touch sensors in the 2×2 capacitive touch sensor pattern has six spatial intersecting points. Herein, it is noted that, the 2×2 capacitive touch sensor pattern as illustrated in FIG. 5 is only for the purpose of illustration and not to limit the disclosure. In other words, the skilled person in the art can adjust the amount of the X-electrodes and Y-electrodes in the capacitive touch sensor pattern according to actual application requirement to manufacture a capacitive touch apparatus with required size.

Figure 6:
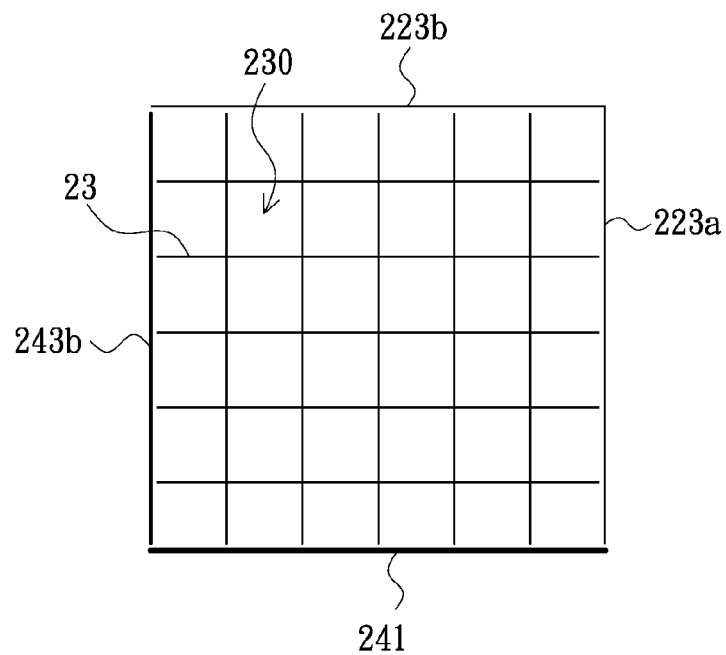
FIG. 6 is an enlarged view of the portion VI in FIG. 5 after being added with a wire-like dummy electrode.

Referring to FIGS. 4 through 6, FIG. 6 showing an enlarged view of the portion VI in FIG. 5 after being added with a wire-like dummy electrode. As illustrated in FIG. 6, the wire-like dummy electrode 23 is arranged in a region of a capacitive touch sensor unoccupied by the X-electrodes Ex1, Ex2 and the Y-electrodes Ey1, Ey2. The wire-like dummy electrode 23 is electrically insulated from the X-electrodes Ex1, Ex2 and the Y-electrodes Ey1, Ey2. Herein, the wire-like dummy electrode 23 can be made of an opaque material such as metal. In addition, it also can be found from FIG. 6 that the wire-like dummy electrode 23 includes a plurality of square meshes 230, so that from an overall perspective, each of the capacitive touch sensors approximately is a mesh structure including a plurality of square meshes 230.

Third Embodiment

Figure 7:
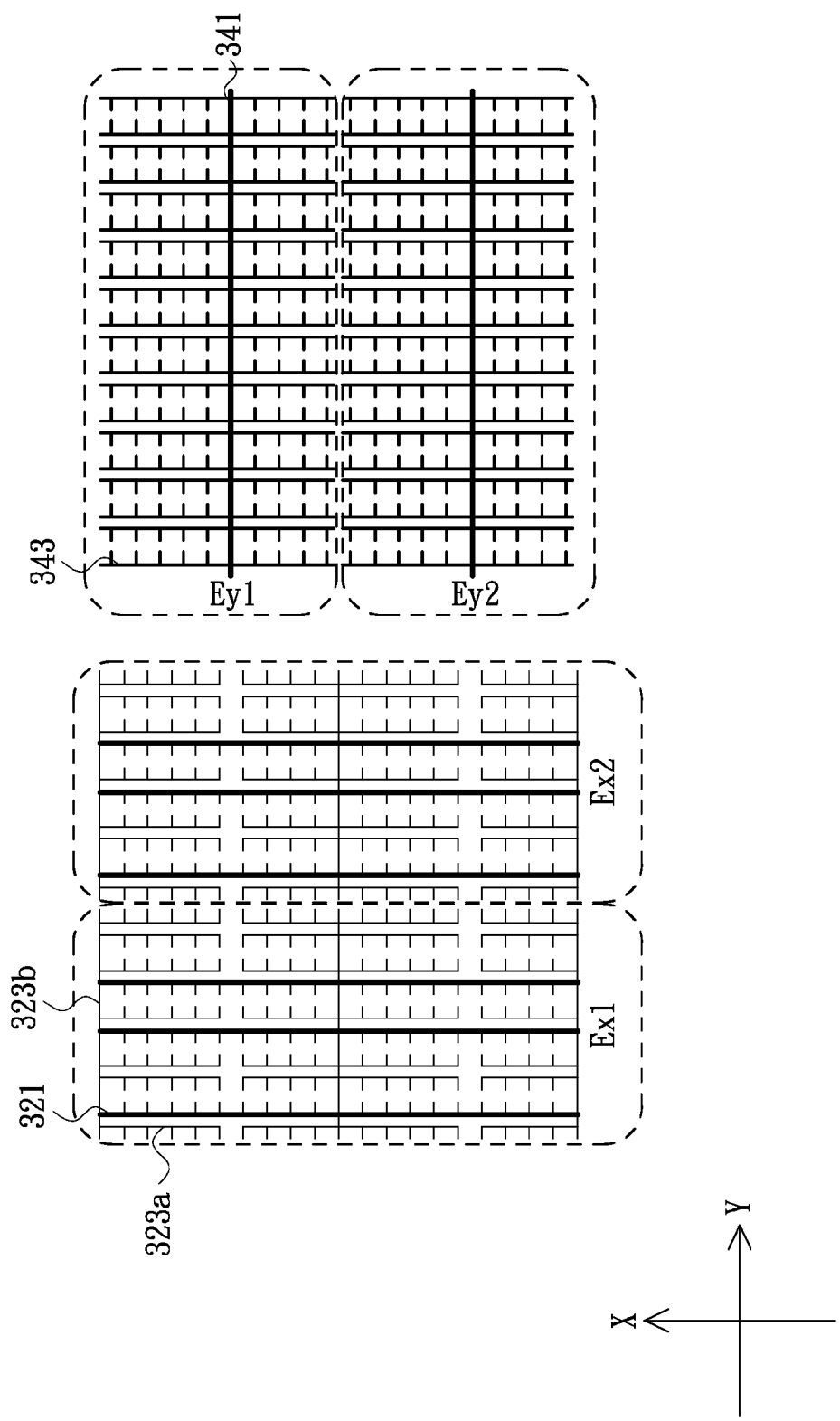
FIG. 7 is a schematic structural view of X-electrodes and Y-electrodes in accordance with a third embodiment of the disclosure.

FIG. 7 shows a schematic structural view of X-electrodes and Y-electrodes in accordance with a third embodiment of the disclosure. In FIG. 7, each of the X-electrodes Ex1, Ex2 and the Y-electrodes Ey1, Ey2 is made of an opaque conductive material such as metal. Herein, the X-electrodes Ex1, Ex2 can respectively serve as driving electrodes of two capacitive touch sensors, while the Y-electrodes Ey1, Ey2 can respectively serve as sensing electrodes of two capacitive touch sensors, vice versa. In the present embodiment, the X-electrodes Ex1 and Ex2 can have a same structural configuration and electrically insulated from each other. Each of the X-electrodes Ex1 and Ex2 is a wire-like electrode and includes a plurality of main wires 321 and sub-wires 323a, 323b electrically connected with the main wires 321. The main wires 321 continuously extend along the X direction and are comb-like structures. The sub-wires 323a extend along the X direction and are discontinuous comb-like structures respectively. The sub-wires 323b extend along the Y direction and are continuous linear structures respectively. The Y-electrodes Ey1 and Ey2 would have a same structural configuration and are electrically insulated from each other. The Y-electrodes Ey1 and Ey2 both are wire-like electrodes and each includes a plurality of main wires 341 and a plurality of sub-wires 343 electrically connected with the main wires 341. The main wires 341 continuously extend along the Y direction and are linear structures. The sub-wires 343 extend along the X direction and are continuous comb-like structures respectively.

Figure 8:
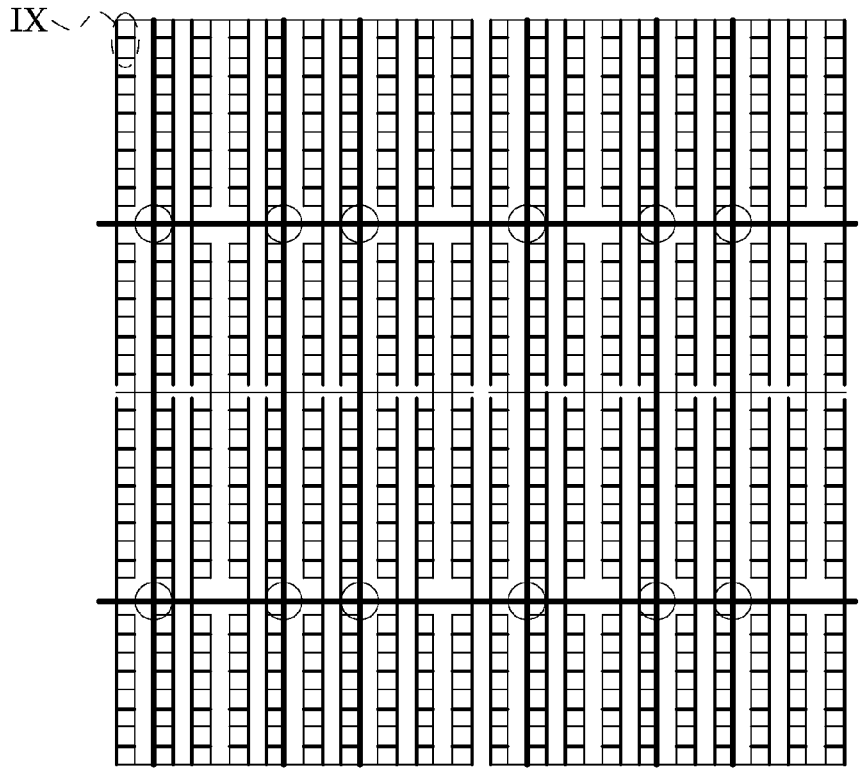
FIG. 8 is a schematic structural view of a plurality of capacitive touch sensors formed by the X-electrodes and Y-electrodes in FIG. 7.

Referring to FIGS. 7 and 8, FIG. 8 showing a schematic structural view of a plurality of capacitive touch sensors formed by the X-electrodes and Y-electrodes in FIG. 7. As illustrated in FIG. 8, the X-electrodes Ex1, Ex2 (as labeled in FIG. 7) are electrically insulated from the Y-electrodes Ey1, Ey2 (as labeled in FIG. 7), and further the X-electrodes Ex1, Ex2 and the Y-electrodes Ey1, Ey2 cooperatively constitute a 2×2 capacitive touch sensor pattern. FIG. 8 shows twelve spatial intersecting points (as denoted by the solid circles in FIG. 8), and each of capacitive touch sensors in the 2×2 capacitive touch sensor pattern has three spatial intersecting points. In addition, it also can be found from FIG. 8 that the main wires 321 and the sub-wires 323a of the X-electrodes Ex1, Ex2 cooperative with the sub-wires 343 of the Y-electrodes Ey1, Ey2 form interdigitated structures. Herein, it is noted that, the 2×2 capacitive touch sensor pattern as illustrated in FIG. 8 is only for the purpose of illustration and not to limit the disclosure. In other words, the skilled person in the art can adjust the amounts of the X-electrodes and Y-electrodes in the capacitive touch sensor pattern according to actual application requirement to manufacture a capacitive touch apparatus with required size.

Figure 9:
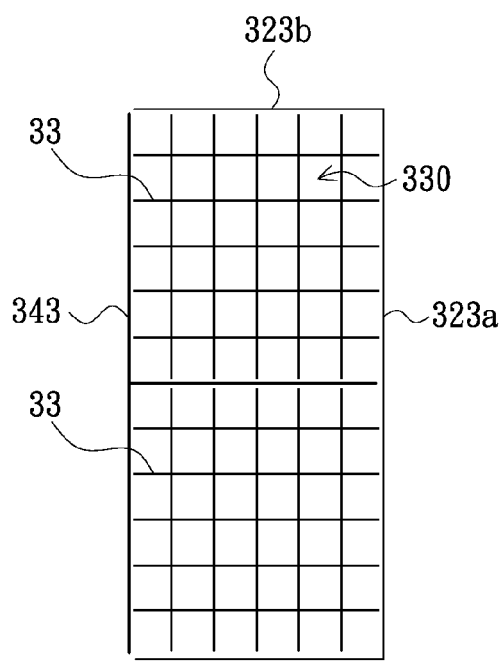
FIG. 9 is an enlarged view of the portion IX in FIG. 8 after being added with a wire-like dummy electrode.

Referring to FIGS. 7 through 9, FIG. 9 showing an enlarged view of the portion IX in FIG. 8 after being added with a wire-like dummy electrode. As illustrated in FIG. 9, the wire-like dummy electrode 33 is arranged in a region of a capacitive touch sensor unoccupied by the X-electrodes Ex1, Ex2 and the Y-electrodes Ey1, Ey2. The wire-like dummy electrode 33 is electrically insulated from the X-electrodes Ex1, Ex2 and the Y-electrodes Ey1, Ey2. Herein, the wire-like dummy electrode 23 can be made of an opaque material such as metal. In addition, it also can be found from FIG. 9 that the wire-like dummy electrode 33 includes a plurality of square meshes 330, so that from an overall perspective, each of the capacitive touch sensors approximately is a mesh structure including a plurality of square meshes 330.

Fourth Embodiment

Figure 10:
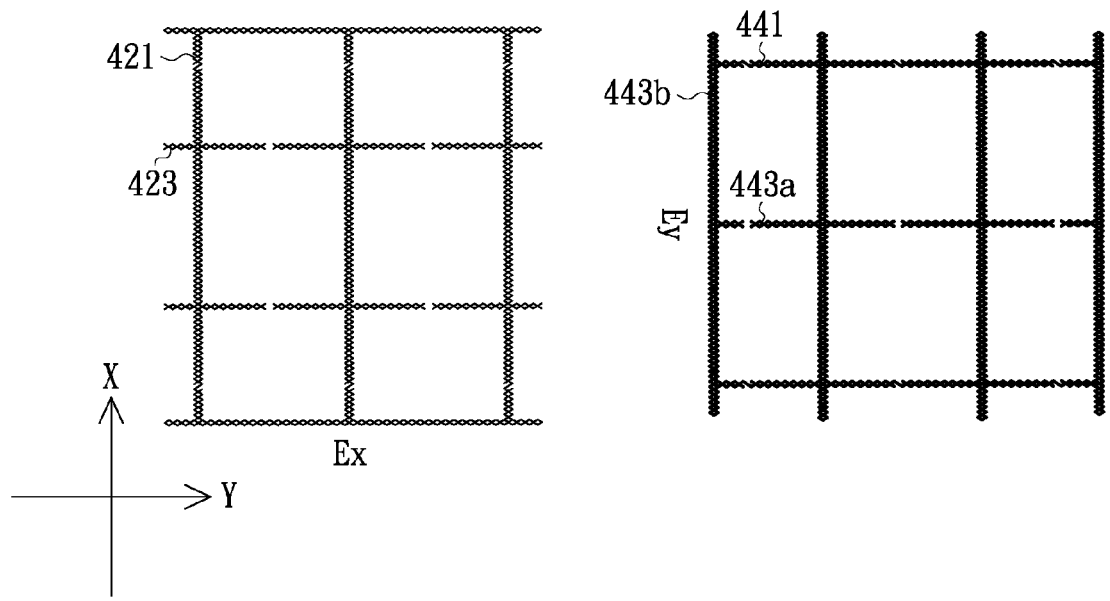
FIG. 10 is a schematic structural view of an X-electrode and a Y-electrode in accordance with a fourth embodiment of the disclosure.

FIG. 10 shows a schematic structural view of an X-electrode and a Y-electrode in accordance with a fourth embodiment of the disclosure. In FIG. 10, the X-electrode Ex and the Y-electrode Ey are electrically insulated from each other and each is made of an opaque conductive material such as metal. The X-electrode Ex can serve as a single driving electrode, while the Y-electrode Ey can serve as a single sensing electrode, vice versa. The X-electrode Ex is a wire-like electrode and includes a plurality of main wires 421 and a plurality of sub-wires 423 electrically connected with the main wires 421. The main wires 421 continuously extend along the X direction and each is a twisting structure. The sub-wires 423 extend along the Y direction, some of the sub-wires 423 are continuous twisting structures, and the other sub-wires 423 are discontinuous twisting structures. The Y-electrode Ey is a wire-like electrode and includes a plurality of main wires 441 and a plurality of sub-wires 443a, 443b electrically connected with the main wires 441. The main wires 441 continuously extend along the Y direction and each is a twisting structure. The sub-wires 443a extend along the Y direction and are discontinuous twisting structures. The sub-wires 443b extend along the X direction and are continuous twisting structures. Moreover, each of the twisting structures in the present embodiment includes a plurality of polygons (not labeled) such as diamond structures successively connected one another, but not to limit the disclosure, that is the diamond structures can be replaced to be other arbitrary polygon structures.

Figure 11:
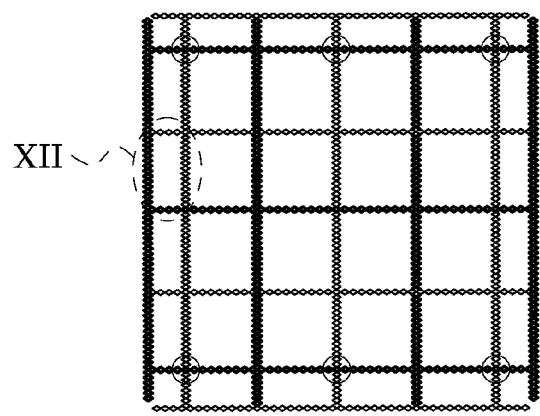
FIG. 11 is a schematic structural view of a single capacitive touch sensor formed by the X-electrode and the Y-electrode as illustrated in FIG. 10.

Referring to FIGS. 10 and 11, FIG. 11 showing a schematic structural view of a single capacitive touch sensor formed by the X-electrode and the Y-electrode as illustrated in FIG. 10. As illustrated in FIG. 11, the X-electrode Ex (as labeled in FIG. 10) and the Y-electrode Ey (as labeled in FIG. 10) cooperatively constitute a single capacitive touch sensor, and the single capacitive touch sensor have six spatial intersecting points (as denoted by the solid circles in FIG. 11). In addition, it is noted that, the structure of the single capacitive touch sensor as illustrated in FIG. 11 is only for the purpose of convenient description and illustration, and in actual applications a plurality of capacitive touch sensors usually are arranged in an array such as in a matrix for use.

Figure 12:
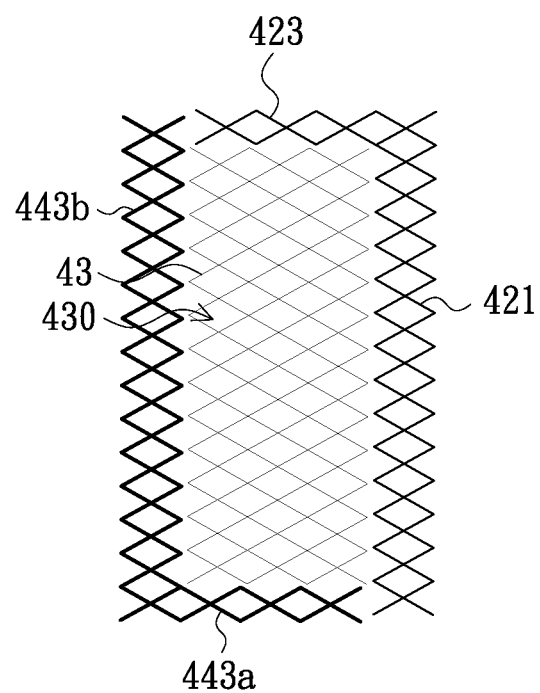
FIG. 12 is an enlarged view of the portion XII in FIG. 11 after being added with a wire-like dummy electrode.

Referring to FIGS. 10 through 12, FIG. 12 showing an enlarged view of the portion XII in FIG. 11 after being added with a wire-like dummy electrode. As illustrated in FIG. 12, the wire-like dummy electrode 43 is arranged in a region of the capacitive touch sensor unoccupied by the X-electrode Ex and the Y-electrode Ey. The wire-like dummy electrode 43 is electrically insulated from both the X-electrode Ex and the Y-electrode Ey. Herein, the wire-like dummy electrode 43 can be made of an opaque material such as metal. In addition, it also can be found from FIG. 12 that the wire-like dummy electrode 43 includes a plurality of diamond meshes 430, so that from an overall perspective the capacitive touch sensor approximately is a mesh structure including a plurality of diamond meshes 430.

Fifth Embodiment

Figure 13:
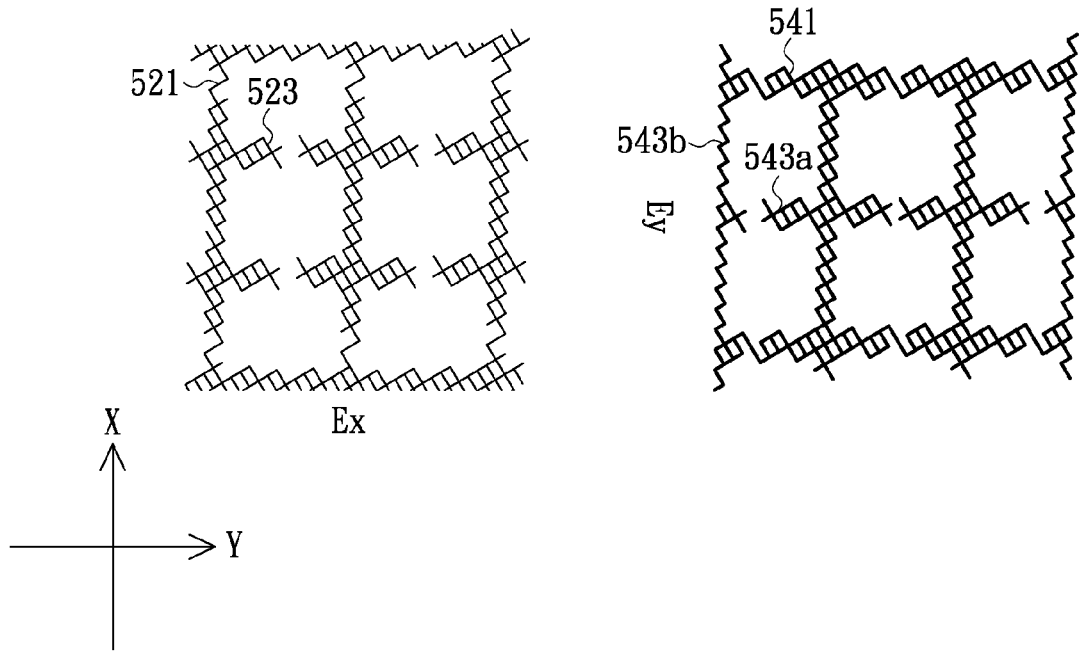
FIG. 13 is a schematic structural view of an X-electrode and a Y-electrode in accordance with a fifth embodiment of the disclosure.

FIG. 13 shows a schematic structural view of an X-electrode and a Y-electrode in accordance with a fifth embodiment of the disclosure. In FIG. 13, the X-electrode Ex and the Y-electrode Ey each is made of an opaque conductive material such as metal. The X-electrode Ex can serve as a single driving electrode while the Y-electrode Ey can serve as a single sensing electrode, vice versa. The X-electrode Ex is a wire-like electrode and includes a plurality of main wires 521 and a plurality of sub-wires 523 electrically connected with the main wires 521. The main wires 521 continuously extend along the X direction and each is a twisting structure. The sub-wires 523 extend along the Y direction, some of the sub-wires 523 are continuous twisting structures, and the other sub-wires 523 are discontinuous twisting structures. The Y-electrode Ey is a wire-like electrode and includes a plurality of main wires 541 and a plurality of sub-wires 543a, 543b electrically connected with the main wires 541. The main wires 541 continuously extend along the Y direction and each is a twisting structure. The sub-wires 543a extend along the Y direction and is a discontinuous twisting structure. The sub-wires 543b extend along the X direction and are continuous twisting structures. Moreover, each of the twisting structures in the present embodiment includes a plurality of polygons such as rectangle structures (not labeled in FIG. 13) successively connected one another, but not to limit the disclosure, that is the rectangle structures can be replaced to be other arbitrary polygon structures.

Figure 14:
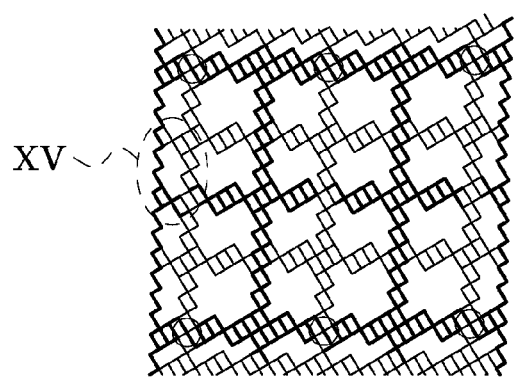
FIG. 14 is a schematic structural view of a single capacitive touch sensor formed by the X-electrode and the Y-electrode as illustrated in FIG. 10.

Referring to FIGS. 13 and 14, FIG. 14 showing a schematic structural view of a single capacitive touch sensor formed by the X-electrode and the Y-electrode as illustrated in FIG. 13. As illustrated in FIG. 14, the X-electrode Ex (as labeled in FIG. 13) and the Y-electrode Ey (as labeled in FIG. 13) cooperatively constitute a single capacitive touch sensor, and the single capacitive touch sensor have six spatial intersecting points (as denoted by the solid circles in FIG. 14). In addition, it is noted that, the structure of the single capacitive touch sensor as illustrated in FIG. 14 is only for the purpose of convenient description and illustration, and in actual applications, a plurality of capacitive touch sensors usually are arranged in an array such as in a matrix for use.

Figure 15:
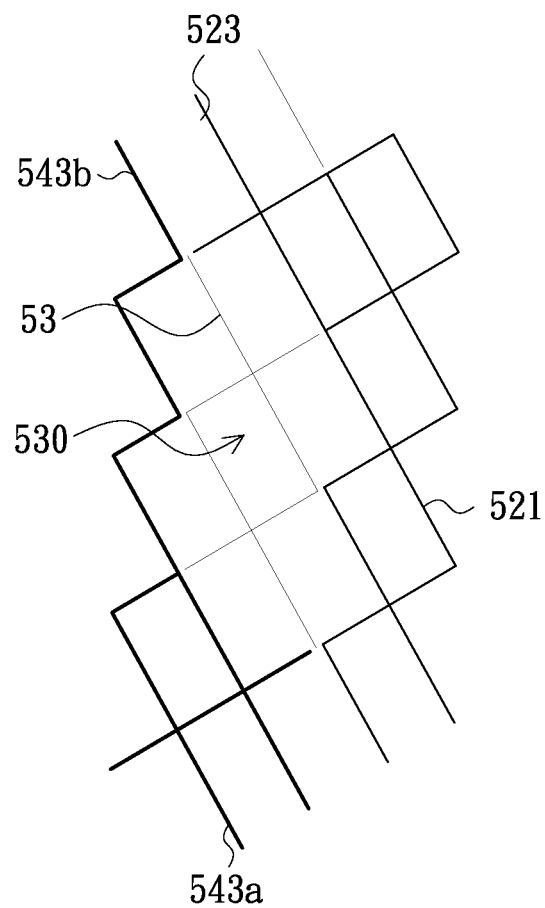
FIG. 15 is an enlarged view of the portion XV in FIG. 14 after being added with a wire-like dummy electrode.

Referring to FIGS. 13 through 15, FIG. 15 showing an enlarged view of the portion XV in FIG. 14 after being added with a wire-like dummy electrode. As illustrated in FIG. 15, the wire-like dummy electrode 53 is arranged in a region of the capacitive touch sensor unoccupied by the X-electrode Ex and the Y-electrode Ey. The wire-like dummy electrode 53 is electrically insulated from both the X-electrode Ex and the Y-electrode Ey. Herein, the wire-like dummy electrode 53 can be made of an opaque material such as metal. In addition, it also can be found from FIG. 15 that the wire-like dummy electrode 53 includes a plurality of rectangle meshes 530, so that from an overall perspective the capacitive touch sensor approximately is a mesh structure including a plurality of rectangle meshes 530.

Additionally, any skilled person in the art can make some modifications/changes to the structures of the X-electrodes and the Y-electrodes, for example suitably changing the wire-like structures of the main wires and not limited to be the above-mentioned linear structures, comb-like structures and twisting structures, suitably changing the structures of the wire-like dummy electrodes and/or the amounts of the meshes, and/or the sub-wires on the X-direction or Y-direction whether are continuous or discontinuous can be determined by actual application requirement as long as it can ensure that sub-wires of one of the X-electrode and the Y-electrode are not intersected with the main-wires and sub-wires of the other one to form a spatial intersecting point. Furthermore, any skilled person in the art can change the amounts of the main wires and/or sub-wires of each the X-electrode and/or Y-electrode, for example for a single capacitive touch sensor one of the X-electrode and Y-electrode only has the main wire(s) and do not have the sub-wires. In addition, the wire-like dummy electrode cooperative with the X-electrode and Y-electrode can form a mesh structure including a plurality of arbitrary polygon (e.g., trapezoid, pentagon, or other polygon) meshes and not limited to be the above-mentioned square meshes, diamond meshes and rectangle meshes. Such modifications/changes ought to be included in the scope and spirit of the disclosure.

Sum up, the various embodiments of the disclosure use the opaque conductive material to manufacture the wire-like electrodes in the capacitive touch sensor, which is different from the prior art that uses the transparent conductive material to manufacture the sheet-like electrodes. The wire-like opaque conductive electrodes such as wire-like metallic electrodes have the advantages of low resistance and low cost, and the use of wire-like structure would relieve the increase of parasitic capacitance resulting from external noise interference. Furthermore, the transparency of the capacitive touch sensor manufactured by the opaque conductive material is substantially not seriously worse than that of the capacitive touch sensor manufactured by the transparent conductive material. In addition, the capacitive touch sensor in accordance with the disclosure can easily achieve highly symmetrical interelectrode patterns. Accordingly, the primary purposes of the disclosure about decreasing sensor resistance, parasitic capacitance between the sensor and external structure, improving touch detection linearity and reducing cost can be achieved.

The above description is given by way of example, and not limitation. Given the above disclosure, one skilled in the art could devise variations that are within the scope and spirit of the disclosure disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A capacitive touch sensor comprising:
   a first wire-like electrode comprising at least a first main wire and a plurality of first sub-wires, wherein each of the at least a first main wire continuously extends along a first direction, and the first sub-wires are electrically connected with the at least a first main wire; and
   a second wire-like electrode comprising at least a second main wire, wherein each of the at least a second main wire continuously extends along a second direction different from the first direction;
   wherein the first wire-like electrode and the second wire-like electrode are electrically insulated from each other, and each of the first wire-like electrode and the second wire-like electrode is made of an opaque conductive material.

2. The capacitive touch sensor as claimed in claim 1, wherein the opaque conductive material comprises metal.

3. The capacitive touch sensor as claimed in claim 1, wherein each of the at least a second main wire is non-intersected with the first sub-wires.

4. The capacitive touch sensor as claimed in claim 3, wherein the second wire-like electrode further comprises a plurality of second sub-wires, the second sub-wires are electrically connected with the at least a second main wire, and the second sub-wires are non-intersected with both the at least a first main wire and the first sub-wires.

5. The capacitive touch sensor as claimed in claim 1, further comprising:
   a plurality of wire-like dummy electrodes arranged in a region of the capacitive touch sensor unoccupied by the first wire-like electrode and the second wire-like electrode, wherein the wire-like dummy electrodes are electrically insulated from the first wire-like electrode and the second wire-like electrode.

6. The capacitive touch sensor as claimed in claim 5, wherein the wire-like dummy electrodes cooperative with the first wire-like electrode and the second wire-like electrode constitute a plurality of square meshes, a plurality of diamond meshes, a plurality of rectangle meshes or a plurality of other arbitrary polygon meshes.

7. The capacitive touch sensor as claimed in claim 1, wherein each of some of the first sub-wires extending along the first direction is discontinuous and further is one of a linear structure, a comb-like structure and a twisting structure.

8. The capacitive touch sensor as claimed in claim 7, wherein the twisting structure comprises successively-connected a plurality of diamonds, a plurality of rectangles or a plurality of other arbitrary polygons.

9. The capacitive touch sensor as claimed in claim 1, wherein the first direction is substantially perpendicular to the second direction.

10. A capacitive touch apparatus comprising:
    a plurality of first metallic electrodes and a plurality of second metallic electrodes, the first metallic electrodes being electrically insulated from each other, the second metallic electrodes being electrically insulated from each other, each of the first metallic electrodes serving as a plurality of metallic driving electrodes, and each of the second metallic electrodes serving as a plurality of metallic sensing electrodes, and thereby the first metallic electrodes being arranged crossing with the second metallic electrodes to form a plurality of capacitive touch sensors each configured with one of the metallic driving electrodes and one of the metallic sensing electrodes;

wherein one of each of the first metallic electrodes and each of the second metallic electrodes comprises at least a first main wire and a plurality of first sub-wires connected with the at least a first main wire, and the at least a first main wire continuously extending along a first direction; and wherein the other one of each of the first metallic electrodes and each of the second metallic electrodes comprises at least a second main wire, the at least a second main wire continuously extending along a second direction different from the first direction and being arranged crossing with the at least a first main wire.

11. The capacitive touch apparatus as claimed in claim 10, wherein each of the at least a second main wire is non-intersected with the first sub-wires.

12. The capacitive touch apparatus as claimed in claim 10, wherein the other one of each of the first metallic electrodes and each of the second metallic electrodes further comprises a plurality of second sub-wires, the second sub-wires are connected with the at least a second main wire and non-intersected with both the at least a first main wire and the first sub-wires.

13. The capacitive touch apparatus as claimed in claim 10, wherein each of the capacitive touch sensors comprises a plurality of metallic dummy electrodes, the metallic dummy electrodes being arranged in a region of the capacitive touch sensor unoccupied by both the metallic driving electrode and the metallic sensing electrode, and the metallic dummy electrodes are electrically insulated from both the metallic driving electrode and the metallic sensing electrode.

14. The capacitive touch apparatus as claimed in claim 13, wherein each of the metallic dummy electrodes cooperative with the metallic driving electrode and the metallic sensing electrode constitute at least a mesh.

15. The capacitive touch apparatus as claimed in claim 14, wherein each of the at least a mesh is a square mesh, a diamond mesh, a rectangle mesh or another arbitrary polygon mesh.

16. The capacitive touch apparatus as claimed in claim 10, wherein each of the at least a first main wire is a linear structure, a comb-like structure or a twisting structure.

17. The capacitive touch apparatus as claimed in claim 10, wherein some of the first sub-wires is/are discontinuous.

18. A capacitive touch sensor comprising:

a driving electrode; and a sensing electrode electrically insulated from the driving electrode, the sensing electrode and the driving electrode both being made of an opaque conductive material;

wherein one of the driving electrode and the sensing electrode comprises a plurality of first wires, some of the first wires extending along a first direction, and the other of the first wires extending along a second direction intersecting with the first direction; and wherein the other one of the driving electrode and the sensing electrode comprises at least a second wire, the at least a second wire and the first wires cooperatively constituting at least a spatial intersecting point.

19. The capacitive touch sensor as claimed in claim 18, wherein the opaque conductive material comprises metal.

20. The capacitive touch sensor as claimed in claim 18, wherein at least one of the first wires is/are continuous, and the remaining of the first wires is/are discontinuous.

* * * * *